(12) United States Patent
Joo et al.

(10) Patent No.: US 10,625,138 B2
(45) Date of Patent: Apr. 21, 2020

(54) SCREEN BASEBALL SYSTEM, HOLE OPENING AND CLOSING APPARATUS AND BALL PITCHING APPARATUS UTILIZED THEREBY, AND METHOD FOR CONTROLLING PITCHING OF SCREEN BASEBALL SYSTEM

(71) Applicant: NEWDIN CONTENTS CO., LTD., Seoul (KR)

(72) Inventors: Sang Hyun Joo, Daejeon (KR); Se Hwan Kim, Daegu (KR); Bong Kyung Ko, Daejeon (KR); Jun Mo Hwang, Seoul (KR); Yeong Jin Noh, Seoul (KR)

(73) Assignee: NEWDIN CONTENTS CO., LTD., Seoul (KR)

( * ) Notice: Subject to any disclaimer, the term of this patent is extended or adjusted under 35 U.S.C. 154(b) by 0 days.

(21) Appl. No.: 15/781,481

(22) PCT Filed: Dec. 16, 2016

(86) PCT No.: PCT/KR2016/014774
§ 371 (c)(1),
(2) Date: Jun. 5, 2018

(87) PCT Pub. No.: WO2017/105121
PCT Pub. Date: Jun. 22, 2017

(65) Prior Publication Data
US 2018/0318691 A1 Nov. 8, 2018

(30) Foreign Application Priority Data
Dec. 18, 2015 (KR) .................... 10-2015-0181552

(51) Int. Cl.
*A63B 71/06* (2006.01)
*A63B 69/00* (2006.01)
(Continued)

(52) U.S. Cl.
CPC ...... *A63B 71/0622* (2013.01); *A63B 69/0002* (2013.01); *A63B 69/406* (2013.01);
(Continued)

(58) Field of Classification Search
None
See application file for complete search history.

(56) References Cited

U.S. PATENT DOCUMENTS

| 6,082,350 A | 7/2000 | Crews et al. |
| 6,111,693 A | 8/2000 | Crews et al. |

(Continued)

FOREIGN PATENT DOCUMENTS

| JP | 09-276467 A | 10/1997 |
| JP | 2002-360757 A | 12/2002 |

(Continued)

OTHER PUBLICATIONS

International Search Report for PCT/KR2016/014774 dated Feb. 27, 2017 from Korean Intellectual Property Office.

*Primary Examiner* — Ronald Laneau
(74) *Attorney, Agent, or Firm* — Revolution IP, PLLC (57) ABSTRACT

A screen baseball system includes: a screen portion arranged in front of a batter's box and having a pitching hole allowing a pitched ball to pass therethrough; a ball pitching device arranged behind the screen portion to pitch a ball toward the batter's box through the pitching hole; and a hole opening/closing device configured to operate to close the pitching hole when the ball pitching device does not pitch the ball and to open the pitching hole when the ball pitching device pitches the ball.

12 Claims, 9 Drawing Sheets

(51) Int. Cl.
    *A63B 69/40*           (2006.01)
    *G05B 15/02*           (2006.01)
    *A63B 102/18*         (2015.01)

(52) U.S. Cl.
    CPC ............. *G05B 15/02* (2013.01); *A63B 69/40* (2013.01); *A63B 2069/0008* (2013.01); *A63B 2071/0638* (2013.01); *A63B 2102/18* (2015.10); *A63B 2220/803* (2013.01)

(56) References Cited

U.S. PATENT DOCUMENTS

| | | | |
|---|---|---|---|
| 7,413,521 B2 * | 8/2008 | Cherry | A63B 71/022 |
| | | | 473/451 |
| 10,350,476 B2 * | 7/2019 | Lee | A63B 69/0002 |
| 2007/0021242 A1 * | 1/2007 | Krickler | A63B 24/0021 |
| | | | 473/451 |
| 2019/0022487 A1 * | 1/2019 | Joo | A63B 69/00 |

FOREIGN PATENT DOCUMENTS

| | | |
|---|---|---|
| JP | 2014-217468 A | 11/2014 |
| KR | 10-1996-0010035 A | 4/1996 |
| KR | 10-2001-0105344 A | 11/2001 |
| KR | 10-2002-0018185 A | 3/2002 |
| KR | 20-0269859 Y1 | 3/2003 |
| KR | 10-0411754 B1 | 12/2003 |
| KR | 10-0919371 B1 | 9/2009 |
| KR | 10-0971352 B1 | 7/2010 |
| KR | 10-2012-0016868 A | 2/2012 |
| KR | 10-2014-0100685 A | 8/2014 |
| KR | 10-1494204 B1 | 2/2015 |
| KR | 10-1548511 B1 | 9/2015 |

\* cited by examiner

SCREEN BASEBALL SYSTEM, HOLE OPENING AND CLOSING APPARATUS AND BALL PITCHING APPARATUS UTILIZED THEREBY, AND METHOD FOR CONTROLLING PITCHING OF SCREEN BASEBALL SYSTEM

TECHNICAL FIELD

The present invention relates to a so-called screen baseball system in which a user hits a ball fired by a ball pitching apparatus with a bat in a room of a predetermined size in an indoor space of a predetermined size, and a sensing apparatus senses such hitting and implements a simulation image through a screen in front of the user, and more particularly, to a hole opening/closing apparatus for opening and closing a pitching hole formed in the screen in the screen baseball system, a ball pitching apparatus for firing a ball toward the batter's box through the pitching hole, and a pitching control method for the screen baseball system.

BACKGROUND ART

With the recent increase in the baseball-playing population, a so-called screen baseball system has emerged that overcomes the limitations of playing baseball in a wide baseball field and allows people to enjoy a virtual baseball game in a small indoor space through virtual reality.

Typically, a screen baseball system is installed in an indoor space and has a batter's box with a space of a predetermined size where a user can bat and a screen capable of displaying a virtual baseball field. When a pitching machine installed behind the screen pitches a ball toward the batter's box, a user preparing to hit the ball in the batter's box hits the ball pitched by the pitching machine. At this time, a sensing apparatus senses movement of the pitched ball and the movement of the ball hit by the user. Then, based on the result of sensing, it is determined whether the pitch is a ball or strike, and a simulation image of the trajectory of the hit ball is implemented on the screen.

In such a screen baseball system, a hole is formed in the screen onto which a baseball simulation image is projected, and a pitching machine installed on the back of the screen pitches a ball through the hole formed in the screen.

The technology related to screen baseball systems using a pitching machine as described above is disclosed in many prior art documents including Korean Patent Application No. 10-2001-7011084, Korean Patent Application No. 10-2014-0058124, Korean Patent Application No. 10-2009-0063347, Korean Patent Application No. 10-2010-0079368, Korean Patent Application No. 1990-7002659, Japanese Unexamined Patent Application Publication No. 09-276467, and Korean Patent Application No. 1994-0023057.

However, for a majority of conventional technologies related to the screen baseball systems including the aforementioned prior art documents, a hole large enough to allow a baseball to pass therethrough is formed in the screen and a pitching machine located behind the screen fires a ball toward the batter's box through the hole formed in the screen. In this case, when an image is projected onto the screen, the image is not displayed at the position of the hole through which the ball passes. Instead, a part of the pitching machine is seen through the hole. As a result, immersion in the image projected onto the screen is seriously deteriorated from the perspective of the user and interest in the screen baseball game is greatly lowered.

DISCLOSURE

Technical Problem

Therefore, it is an object of the present invention to provide a screen baseball system that has a pitching machine to pitch a ball through a hole formed in a screen and is configured to allow the hole in the screen to be opened only when the pitching machine pitches a ball and be closed when the pitching machine does not pitch a ball, such that an image projected onto the screen can be naturally seen without an omitted portion to greatly improve immersion of the user in the screen baseball game through the images projected onto the screen and configured to cause the hole to be opened and closed and the ball to be pitched in repose to the motion and pitching of a virtual pitcher in the image projected onto the screen to provide virtual reality as if the user hits a ball pitched by an actual pitcher, a hole opening/closing apparatus used therefor, a ball pitching apparatus used therefor, and a pitching control method of the screen baseball system.

Technical Solution

In accordance with the present invention, the above and other objects can be accomplished by the provision of a screen baseball system including a screen portion arranged in front of a batter's box and having a pitching hole allowing a pitched ball to pass therethrough, a ball pitching device arranged behind the screen portion to pitch a ball toward the batter's box through the pitching hole, and a hole opening/closing device configured to operate to close the pitching hole when the ball pitching device does not pitch the ball and to open the pitching hole when the ball pitching device pitches the ball.

The opening/closing unit may include an opening/closing member configured to open or close the pitching hole, and an opening/closing driver configured to provide driving force to an operation of the opening/closing member.

The opening/closing member may include any one of a sliding opening/closing member configured to open or close the pitching hole by sliding vertically or horizontally in a linear direction, a rotational opening/closing member configured to open or close the pitching hole by rotating about a pivot point along a surface of the screen portion, and a door opening/closing member hinged to one side of the pitching hole to open or close the pitching hole, wherein the opening/closing driver may include any one of a sliding drive motor configured to provide sliding driving force to the sliding opening/closing member, a rotational drive motor configured to provide rotational driving force to the rotational opening/closing member, and a door drive motor configured to provide rotational driving force to the door opening/closing member, depending on a type of the opening/closing member.

In accordance with another aspect of the present invention, there is provided a screen baseball system including a screen portion arranged in front of a batter's box and having a pitching hole allowing a pitched ball to pass therethrough, a ball pitching device arranged behind the screen portion to pitch a ball toward the batter's box through the pitching hole, and a cover member arranged to cover the pitching hole in the screen portion and allowing the pitching ball to pass therethrough when the ball is pitched by the ball pitching device.

The cover member may include one of a blind screen fixed to a periphery of the pitching hole at one side and forming a free end at an opposite side to allow the ball pitched through the pitching hole to pass therethrough by opening a part of the blind screen corresponding to the free end, and a permeable screen having a plurality of element members arranged at predetermined intervals so as to cover the pitching hole and allowing the ball pitched through the pitching hole to pass through the permeable screen by pressing through a space between the element members.

In accordance with another aspect of the present invention, there is provided a screen baseball system including a screen portion arranged in front of a batter's box and having a pitching hole allowing a pitched ball to pass therethrough, a ball pitching device arranged behind the screen portion to pitch a ball toward the batter's box through the pitching hole, an image implementation unit configured to implement an image of a virtual pitcher pitching a ball and project the image onto the screen portion, a hole opening/closing device configured to open or close the pitching hole, and a controller configured to control the ball pitching device to pitch the ball according to the image implemented by the image implementation unit and control opening/closing of the pitching hole by the hole opening/closing device.

The ball pitching device may include a ball feeder configured to feed a ball to a position for pitching, a pitching driver configured to fire the ball fed by the ball feeder, and a pitching controller configured to control the pitching driver according to a ball fire signal of the controller so as to fire a prepared ball.

The hole opening/closing device may include an opening/closing member configured to open or close the pitching hole, and an opening/closing driver configured to provide driving force to an operation of the opening/closing member and controlled by the pitching controller of the ball pitching device to cause the opening/closing member keeping the pitching hole closed to open the pitching hole before the pitching driver fires the ball and to cause the opening/closing member to close the pitching hole again after the pitching driver fires the ball.

The controller may sense a pitching motion of the virtual pitcher in the image implemented by the image implementation unit, wherein the controller may instruct the hole opening/closing device to operate as the virtual pitcher takes a preset pitching motion and instruct the ball pitching device to fire a prepared ball according to the ball pitched by the virtual pitcher in the image.

In accordance with another aspect of the present invention, there is provided a hole opening/closing apparatus used in a screen baseball system including a screen portion arranged in front of a batter's box, a ball pitching device arranged behind the screen portion to pitch a ball through a pitching hole formed in the screen portion, an image implementation unit configured to project a baseball image onto the screen portion, and a controller, the hole opening/closing apparatus including an opening/closing member configured to open or close the pitching hole, an opening/closing driver configured to provide driving force to an operation of the opening/closing member, and an opening/closing controller configured to control the opening/closing driver according to a control signal of the controller to cause the opening/closing member to open or close the pitching hole.

In accordance with another aspect of the present invention, there is provided a ball pitching apparatus used in a screen base system including a screen portion arranged in front of a batter's box, an image implementation unit configured to project a baseball image onto the screen portion, and a controller and configured to include a ball feeder arranged behind the screen portion to feed a ball to a position for pitching such that the ball is pitched through a pitching hole formed in the screen portion, and a pitching driver configured to fire the ball fed by the ball feeder, the ball pitching apparatus including an opening/closing member configured to open or close the pitching hole formed in the screen portion, an opening/closing driver configured to provide driving force to an operation of the opening/closing member, and a pitching controller configured to control the opening/closing driver to cause the opening/closing member to open or close the pitching hole of the controller and to control the pitching driver to fire a prepared ball, according to a control signal of the controller of the screen baseball system.

In accordance with another aspect of the present invention, there is provided a method of controlling pitching in a screen baseball system including a screen portion arranged in front of a batter's box, a ball pitching device arranged behind the screen portion to pitch a ball through a pitching hole formed in the screen portion, and an image implementation unit configured to project a baseball image onto the screen portion, the method including sensing an image implemented by the image implementation unit, transmitting a signal according to the sensed image to cause a hole opening/closing device configured to open or close the pitching hole to open the pitching hole, transmitting a fire signal according to the sensed image to cause the ball pitching device to fire the ball, and firing the ball according to the firing signal.

The sensing of the image may include sensing at least one of a pitching motion of a virtual pitcher in the image implemented by the image implementation unit and a ball pitched by the virtual pitcher in the image.

The method may further include transmitting a signal to the ball pitching device so as to prepare to fire a ball according to a preset pitching condition as a preset pitching motion of the virtual pitcher is sensed in the image implemented by the image implementation unit, the transmitting of the signal being performed before the transmitting of the signal to open the pitching hole or the transmitting of the fire signal.

The transmitting of the signal to open the pitching hole may include sensing whether the virtual pitcher in the image implemented by the image implementation unit takes a preset specific motion among motions of the virtual pitcher from windup to follow-through and transmitting a signal to cause the hole opening/closing device to open the pitching hole.

The transmitting of the fire signal may include transmitting the fire signal to cause the ball pitching device to fire the ball according to any one of sensing whether the virtual pitcher in the image implemented by the image implementation unit takes a preset specific motion among motions of the virtual pitcher from windup to follow-through, sensing whether the ball pitched by the virtual pitcher is located at a preset position on the image, and sensing whether the ball pitched by the virtual pitcher has disappeared from the image.

The method may further include transmitting a signal to cause the hole opening/closing device to close the pitching hole when a preset time passes after the transmitting of the fire signal or when a preset time passes after the firing of the ball.

Advantageous Effects

The present invention provides a screen baseball system, a hole opening/closing apparatus used therefor, a ball pitching apparatus used therefor, and a pitching control method of the screen baseball system. Specifically, the present invention provides a screen baseball system that has a pitching machine to pitch a ball through a hole formed in a screen and is configured to allow the hole in the screen to be opened only when the pitching machine pitches a ball and be closed when the pitching machine does not pitch a ball, such that an image projected onto the screen can be naturally seen without an omitted portion to greatly improve immersion of the user in the screen baseball game through the images projected onto the screen and configured to cause the hole to be opened and closed and the ball to be pitched in repose to the motion and pitching of a virtual pitcher in the image projected onto the screen to provide virtual reality as if the user hits a ball pitched by an actual pitcher, a hole opening/closing apparatus used therefor, a ball pitching apparatus used therefor, and a pitching control method of the screen baseball system.

BEST MODE

A screen baseball system, a hole opening/closing apparatus used therefor, a ball pitching apparatus used therefore, and a pitching control method of the screen baseball system according to the present invention will be described in more detail below with reference to the drawings.

Figure 1:
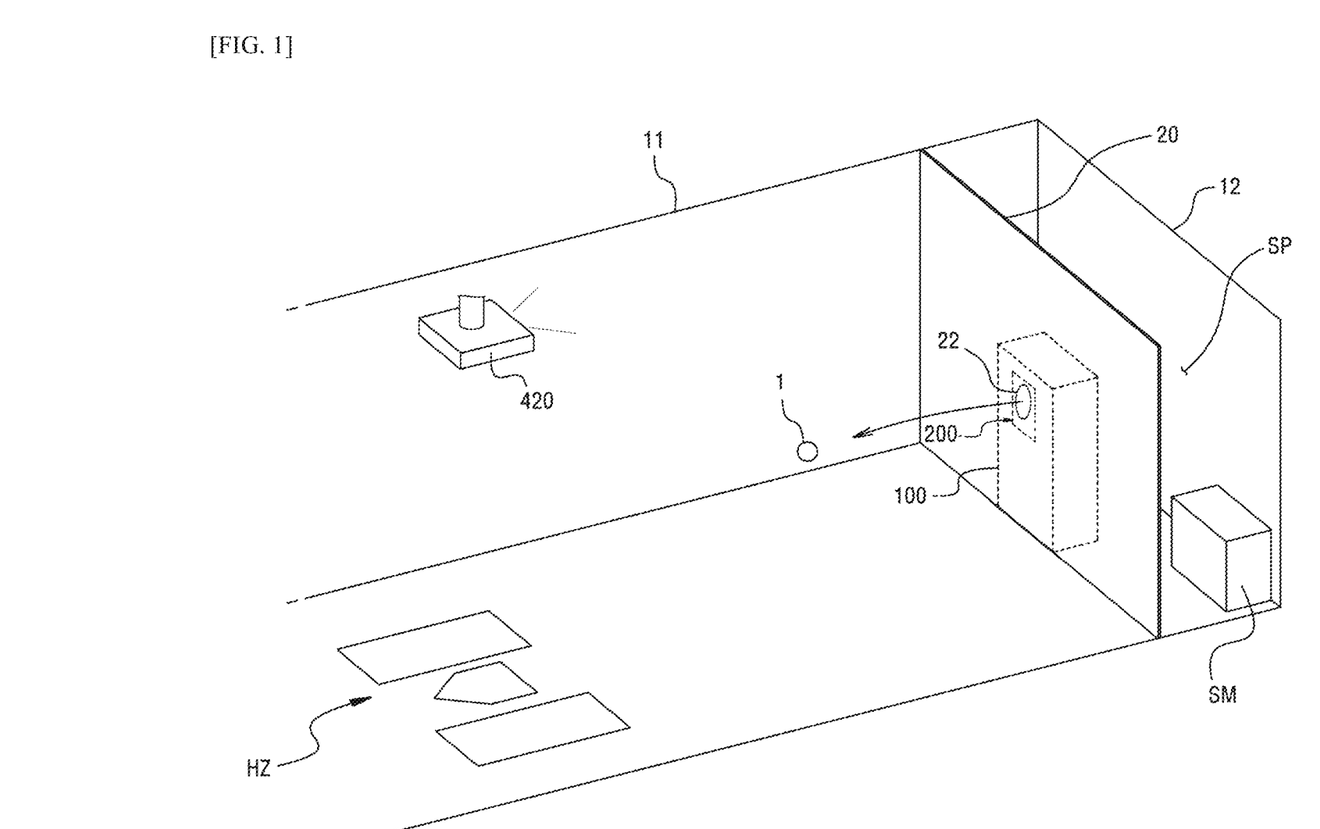
FIG. 1 is a view showing an example of a screen baseball system according to an embodiment of the present invention.

First, a screen baseball system according to an embodiment of the present invention will be described with reference to FIG. 1. FIG. 1 is a view showing an example of a screen baseball system according to an embodiment of the present invention.

Similar to a typical screen baseball system, the screen baseball system according to an embodiment of the present invention includes a batting zone HZ and a screen portion 20, which are arranged in a space defined by a side wall 11 and a rear wall 12, and is implemented such that the user can bat with a bat in the batting zone HZ.

A simulator SM for processing information on a baseball simulation image to be projected onto the screen portion 20 is provided in a space SP between the screen portion 20 and the rear wall 12 (wherein the image processed by the simulator SM is projected onto the screen portion 20 through an image output unit 420), a ball pitching device 100 capable of pitching a ball 1 toward the batting zone HZ is provided, and a pitching hole 22 is formed in the screen portion 20 at a position corresponding to a part of the ball pitching device 100 from which the ball is fired, such the ball 1 can pass through the pitching hole.

The screen baseball system according to an embodiment of the present invention includes a hole opening/closing device 200 for opening and closing the pitching hole 22 in the screen portion 20.

Although not shown in the drawing, a sensing apparatus for sensing a ball pitched by the ball pitching device 100 and a ball hit by the user in the batting zone HZ may also be provided. This sensing apparatus is irrelevant to the features of the present invention, and thus the description thereof will be omitted.

Hereinafter, referring to FIG. 2, control schemes of the respective components constituting the screen baseball system according to an embodiment of the present invention as shown in FIG. 1 will be described with reference to FIG. 2.

Figure 2:
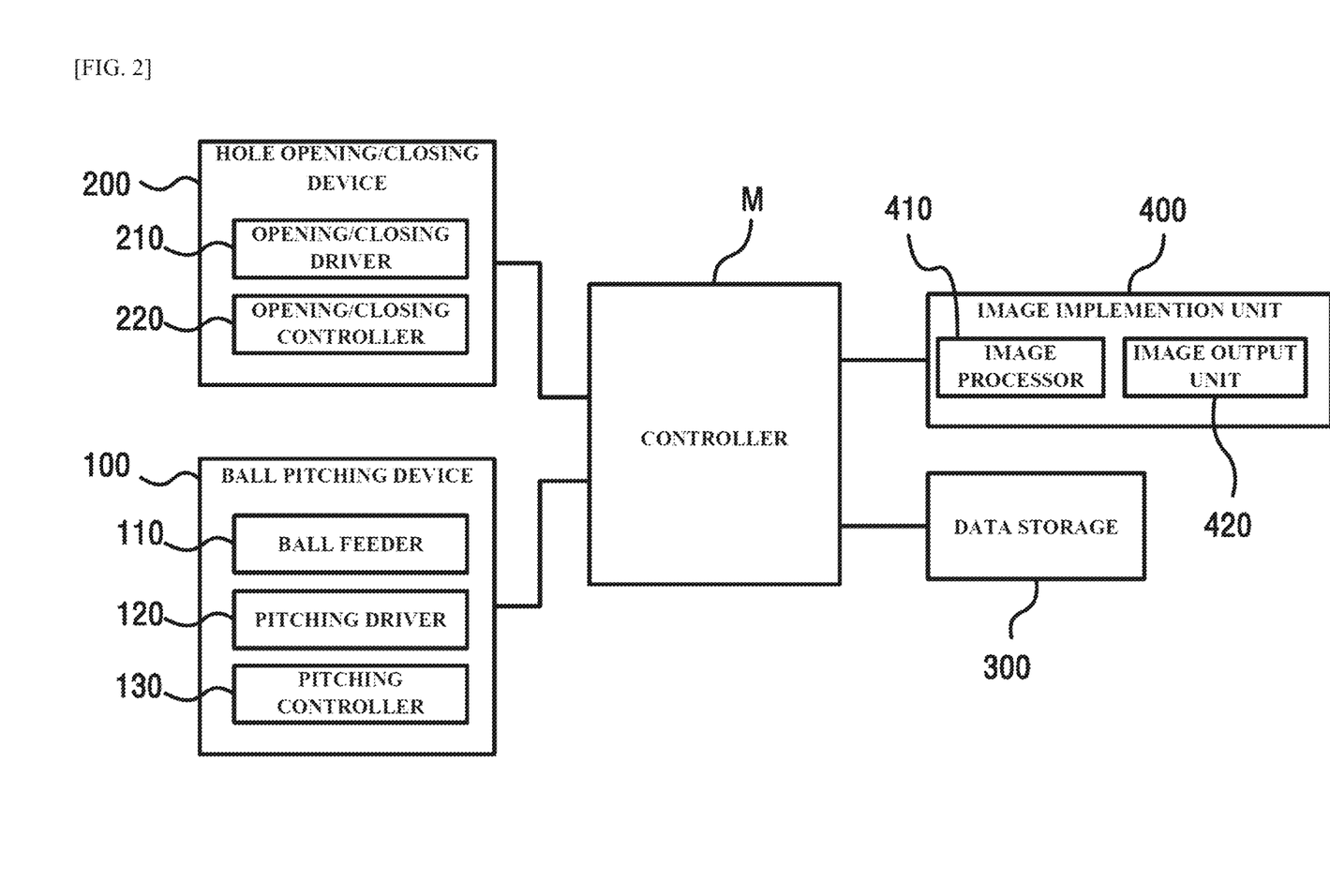
FIGS. 2 and 3 are block diagrams respectively illustrating control schemes of respective components constituting a screen baseball system according to an embodiment and another embodiment of the present invention.

As shown in FIG. 2, the screen baseball system according to an embodiment of the present invention may include a ball pitching device 100, a hole opening/closing device 200, a data storage 300, an image implementation unit 400, and a controller M.

Specifically, the image implementation unit 400 may include an image processor 410 and an image output unit 420.

The simulator SM shown in FIG. 1 may include the data storage 300, the image processor 410, and the controller M, and the image output unit 420 may be implemented by a projector capable of projecting an image processed by the image processor 410 onto the screen portion.

The data storage 300 is a part where data for processing a baseball simulation image or the like in the screen baseball system is stored. The data storage 300 may serve as a storage to temporarily store data received from a server (not shown).

The image implementation unit 400 is an element that is configured to implement various kinds of baseball simulation-related images including a background image such as an image of a virtual baseball field and images of players, umpires, an audience, and the like, an image of a virtual pitcher pitching a ball, and a simulation image of a trajectory of a ball hit by the user and project the same onto the screen portion 20.

Specifically, in order to generate various kinds of baseball simulation-related images, the image implementation unit 400 may include the image processor 410 for performing image data processing and the image output unit 420 for projecting the images processed by the image processor 410 onto the screen portion 20.

The ball pitching device 100, which is installed on the rear surface of the screen portion 20 to fire a ball through the pitching hole 22 in the screen portion 20, may include a ball feeder 110, a pitching driver 120, and a pitching controller 130.

The ball feeder 110 is a component that transports balls one by one from a storage box in which a plurality of balls is stored to the pitching driver 120, i.e., a position for pitching.

The pitching driver 120 is a component for projecting a ball fed by the ball feeder 110. The pitching driver 120 may be implemented in various ways. The pitching driver may be implemented so to rotate one wheel and project a ball placed between the wheel and the guide plate by rotational force of the wheel (e.g., Japanese Laid-Open Patent Application No. 2014-217468), to rotate two or more wheels, position a ball between the wheels and pitch the ball by the rotational force of the wheels (e.g., Korean Patent Application Publication No. 2014-0100685, Korean Patent No. 0411754, Korean Utility Model No. 0269859, etc.), or to throw a ball by rotating an arm holding the ball (e.g., Korean Patent No. 0919371).

Specific configurations of the ball feeder 110 and the pitching driver 120 have already been disclosed in various prior art documents, and therefore a detailed description thereof will be omitted.

The opening/closing unit 200, which is a component configured to open or close the pitching hole 22 in the screen portion 20 using the opening/closing member, includes an opening/closing driver 210 configured to provide driving force to the opening/closing operation of the opening/closing member and an opening/closing controller 220 configured to control the operation of the opening/closing driver 210 according to a control signal of the controller M of the screen baseball system.

Here, the term "hole opening/closing device" is the name of a component of the screen baseball system that is employed for consistency with the names of other components. The hole opening/closing device can be understood as a "hole opening/closing apparatus" (the "hole opening/closing apparatus" cited in claim 10 is the same as the hole opening/closing device including the opening/closing driver and the opening/closing controller).

The opening/closing member and the opening/closing driver 210 for driving the opening/closing member can be implemented in various ways. Specific examples of the construction thereof will be described below with reference to FIGS. 4 to 6.

The controller M controls each component of the screen baseball system according to the present invention and performs various operations for realizing a baseball simulation image.

Particularly, the controller M functions to determine the time at which the pitching hole 22 is opened or closed by the hole opening/closing device 200, the time at which preparation for ball pitching is performed by the ball pitching device 100, and the time at which a prepared ball is pitched (fired) and to send a control signal to the pitching controller 130 and the opening/closing controller 220 to instruct execution of a corresponding operation.

The opening/closing controller 220 controls the opening/closing driver 210 such that the opening/closing member of the hole opening/closing device 200 is basically positioned to close the pitching hole 22 of the screen portion 20.

When the opening/closing member keeps the pitching hole closed, an image projected onto the screen portion may be naturally seen without being omitted at the position of the pitching hole.

When the opening/closing member keeps the pitching hole closed as described above, the opening/closing controller 220 controls the opening/closing driver 210 to drive the opening/closing member to open the pitching hole before the pitching driver 120 of the ball pitching device 100 fires a ball. After the pitching driver 120 fires the ball, the opening/closing controller 220 controls the opening/closing driver 210 such that the opening/closing member closes the pitching hole again.

In the embodiment shown in FIG. 2, the ball pitching device and the hole opening/closing device respectively have an independent control means, and receive a control signal from the controller M to independently perform control of opening/closing of the pitching hole and control of pitching of the ball.

Figure 3:
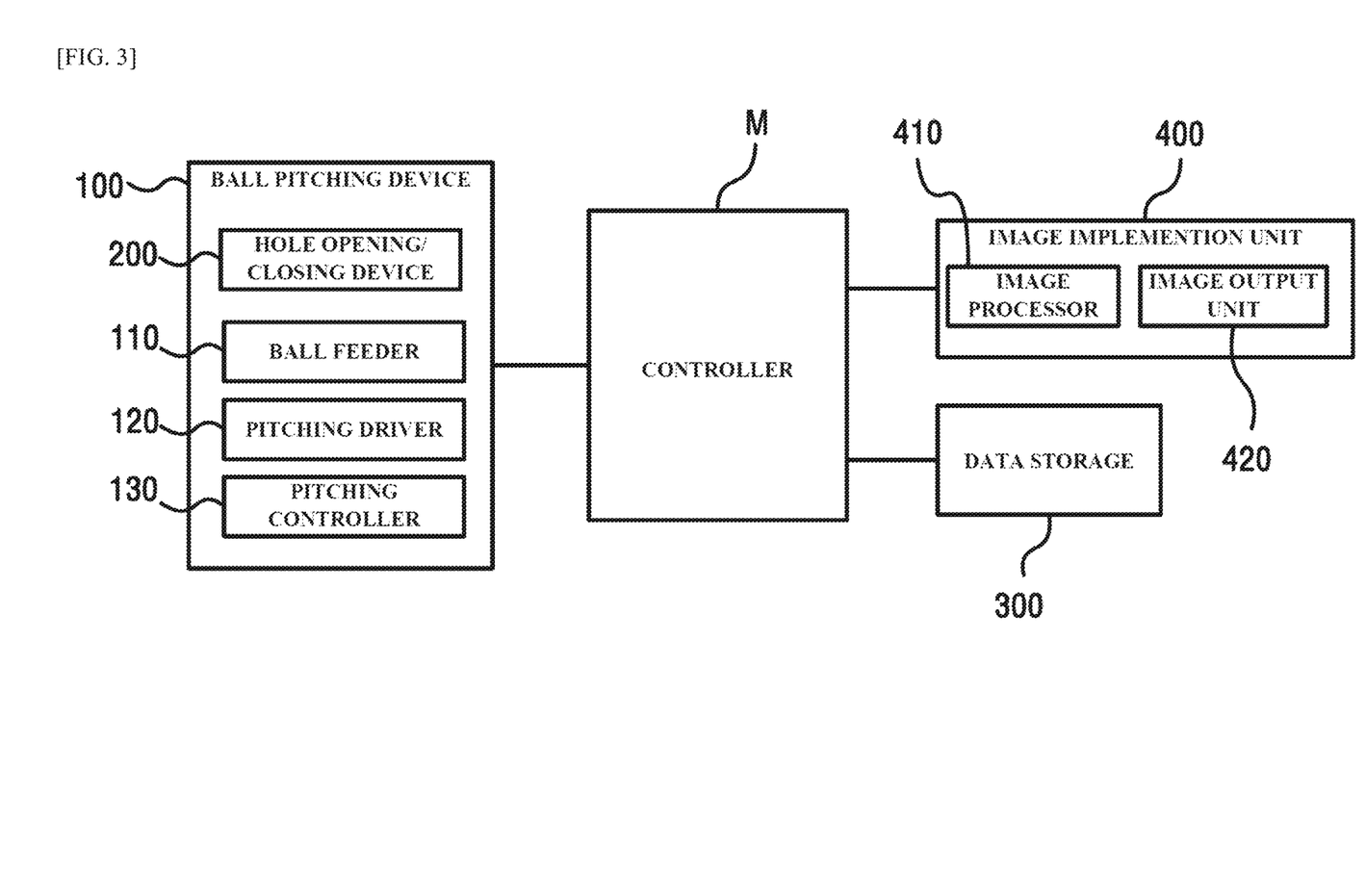

FIG. 3 is a block diagram illustrating a configuration of a screen baseball system according to another embodiment of the present invention. In the embodiment shown in FIG. 3, the data storage 300, the image implementation unit 400 and the controller M are basically the same as those in the embodiment shown in FIG. 2, but the hole opening/closing device is provided as a component of the ball pitching device, not an apparatus having an independent control means. In the following, only the differences will be described.

As shown in FIG. 3, the ball pitching device 100 of this embodiment includes not only the ball feeder 110, the pitching driver 120 and the pitching controller 130 but also the hole opening/closing device 200. The hole opening/closing device 200 is driven under control of the pitching controller (130).

Here, the term "ball pitching device" is the name of a component of the screen baseball system that is employed for consistency with the names of other components. The ball pitching device can be understood as a "ball pitching apparatus" (the "ball pitching apparatus" cited in claim 11 is the same as the ball pitching device including the hole opening/closing device, the ball feeder, the pitching driver, and the pitching controller).

In the embodiment shown in FIG. 3, the hole opening/closing device 200 substantially means an opening/closing driver for driving the opening/closing member. As in the embodiment shown in FIG. 2, in which the opening/closing driver operates under control of the opening/closing controller, the hole opening/closing device (the opening/closing driver) in the embodiment shown in FIG. 3 operates under control of the pitching controller 130.

That is, the opening/closing member keeps the pitching hole closed. Then, before the pitching driver 120 of the ball pitching device 100 fires a ball, the pitching controller 130 controls the hole opening/closing device 200 to drive the opening/closing member to open the pitching hole. After the pitching driver 120 fires the ball, the pitching controller 130 controls the hole opening/closing device 200 such that the opening/closing member closes the pitching hole again. All such control operations are performed by the control signal transmitted by the controller M.

Figure 4:
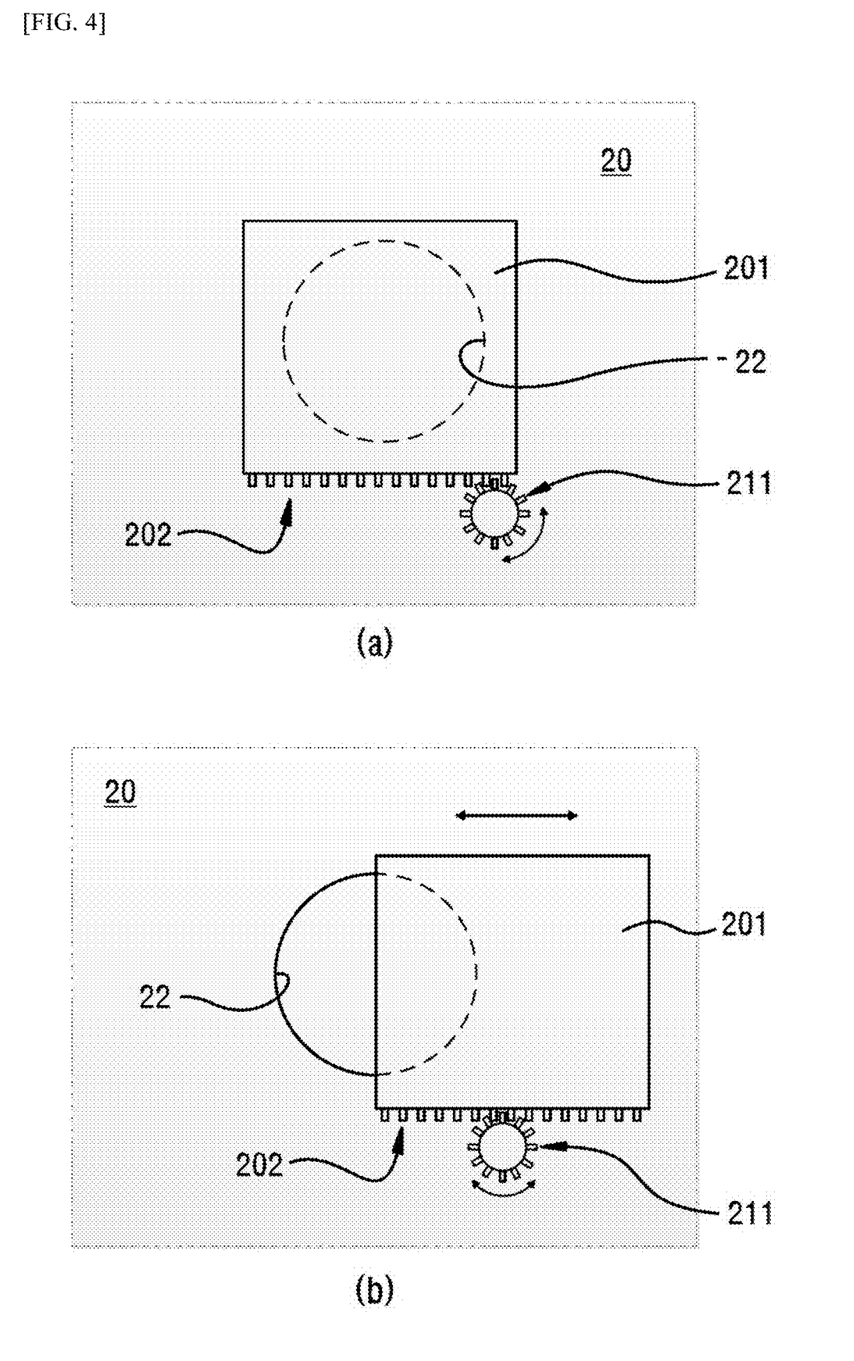
FIGS. 4 to 6 are views showing specific examples of an opening/closing member and an opening/closing driver of a hole opening/closing device of the screen baseball system according to the present invention.
Figure 5:
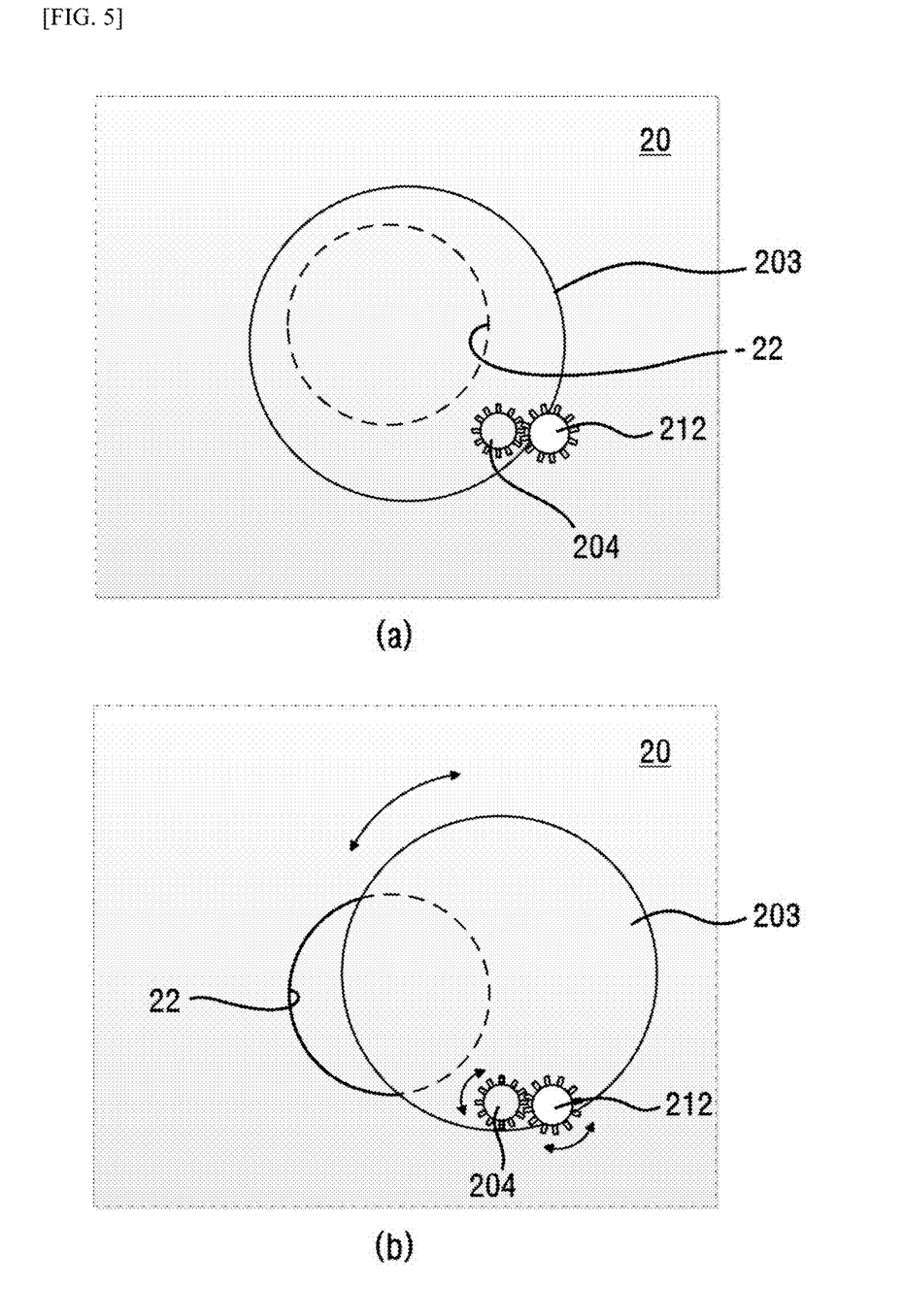
Figure 6:
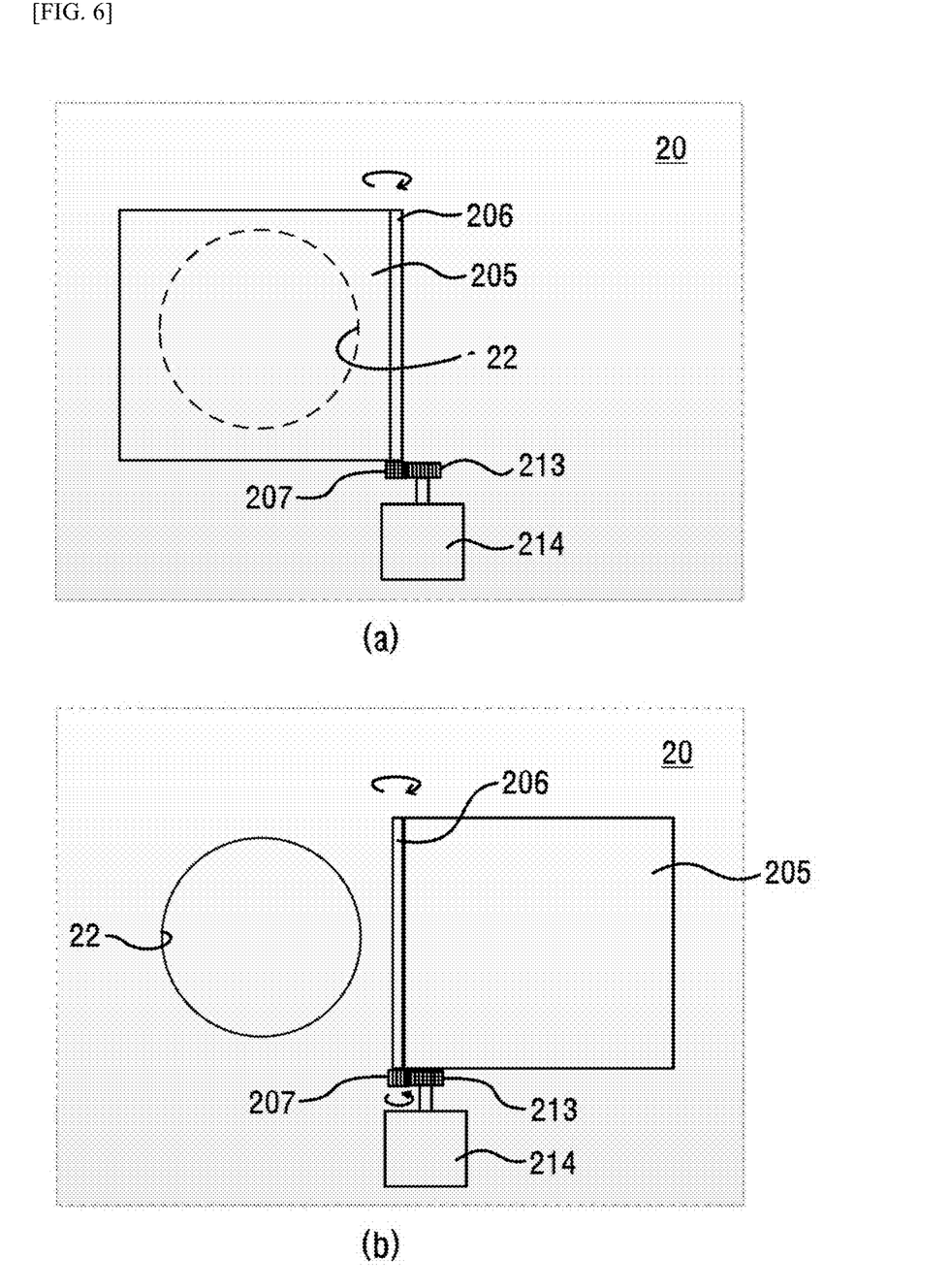

FIGS. 4 to 6 show specific examples of the opening/closing member of the hole opening/closing device (or hole opening/closing apparatus) and the opening/closing driver.

The opening/closing member may be implemented in various forms such as a sliding opening/closing member that opens/closes the pitching hole by sliding vertically or horizontally in a linear direction; a rotational opening/closing member that opens or closes the pitching hole by rotating about a pivot point along the surface of the screen portion, and a door opening/closing member hinged to one side of the pitching hole to open or close the pitching hole. Accordingly, the opening/closing driver may be implemented in various forms such as a sliding drive motor for providing sliding driving force to the sliding opening/closing member, a rotation drive motor for providing rotational driving force to the rotational opening/closing member, and a door drive motor for providing rotational driving force to the door opening/closing member.

FIG. 4 illustrates the sliding opening/closing member, FIG. 5 illustrates the rotational opening/closing member, and FIG. 6 illustrates the door opening/closing member.

First, the sliding opening/closing member shown in FIG. 4 will be described. FIG. 4(a) shows that the pitching hole 22 formed in the screen portion 20 remains closed by the sliding opening/closing member 201, and FIG. 4(b) shows that the sliding opening/closing member 201 is slidably moved by a rotational gear portion 211 of the opening/closing driver to open the pitching hole 22.

In the drawing, the sliding drive motor of the opening/closing driver is omitted. The rotational gear portion 211 is rotated by the sliding drive motor (not shown).

As shown in FIGS. 4(a) and 4(b), a rack gear portion 202 is provided on one side of the sliding opening/closing member 201 and the rotational gear portion 2011 of the opening/closing driver is engaged with the rack gear portion 202. Accordingly, as the rotational gear portion 211 rotates, the rack gear portion 202 engaged therewith moves, such that the sliding opening/closing member 201 slides to open or close the pitching hole 22.

FIGS. 4(a) and 4(b) show a case where the rack gear portion 202 is horizontally formed on one side of the sliding opening/closing member 201 so as to horizontally slide. If the rack gear portion is vertically formed on one side of the sliding opening/closing member, the sliding opening/closing member may vertically slide by rotation of the rotational gear portion 211.

While FIGS. 4(a) and 4(b) illustrate a configuration in which the sliding opening/closing member is moved by means of the rack gear portion and the rotational gear portion engaged with the rack gear portion, the present invention is not limited thereto. The hole opening/closing device of the screen baseball system according to the present invention may include any element that enables the driving force to be applied to perform linear movement.

For example, a linear motor may be connected to the opening/closing member to directly move the opening/closing member in a linear direction, or a belt or chain structure may be employed instead of the gear structure.

Hereinafter, the rotation opening/closing member system shown in FIG. 5 will be described. FIG. 5(a) shows that the pitching hole 22 formed in the screen portion 20 remains closed by the rotational opening/closing member 202, and FIG. 5(b) shows that the pitching hole 22 is opened as the rotational opening/closing member 203 is rotated about the pivot point by the drive gear portion 212 of the opening/closing driver.

In the drawing, the rotation drive motor of the opening/closing driver is omitted. The drive gear portion 2121 is rotated by rotation of the drive motor (not shown).

As shown in FIGS. 5(a) and 5(b), a driven gear portion 204 is provided on one side of the rotational opening/closing member 203, that is, at a position at which a pivot point for rotation is formed, and the drive gear portion 212 of the opening/closing driver is engaged with the driven gear portion 204. Accordingly, when the drive gear portion 212 rotates, the driven gear portion 204 engaged therewith rotates, and thus the rotational opening/closing member 203 rotates about the center (the pivot point) of the driven gear portion 204 to open or close the pitching hole 22 (the driven gear portion 204 is fixedly coupled to the rotational opening/closing member 203 and thus rotates together with the rotational opening/closing member).

While FIGS. 5(a) and 5(b) illustrate a configuration in which the rotational opening/closing member is rotated by means of the driven gear portion and the drive gear portion engaged therewith, the present invention is not limited thereto. The hole opening/closing device of the screen baseball system according to the present invention includes any element capable of rotationally driving the rotational opening/closing member about the pivot point.

For example, a belt or chain structure may be employed instead of the gear structure, and the pivot point may be located outside the rotational opening/closing member (an arm rotated by a motor shaft may be fixed to the rotational opening/closing member, and the opening/closing member may be rotationally driven by the rotating arm).

Hereinafter, the door opening/closing member shown in FIG. 6 will be described. FIG. 6(a) shows that the pitching hole 22 formed in the screen portion 20 remains closed by the door opening/closing member 205, and FIG. 6(b) shows that the door opening/closing member 205 is rotated about a hinge shaft 206 by the opening/closing driver (the drive gear portion 213 and the door drive motor 214) to open the pitching hole 22.

As shown in FIGS. 6(a) and 6(b), the hinge shaft 206 for rotation is provided on one side of the door opening/closing member 205 and a driven gear portion 207 is provided on one side of the hinge shaft 206. In addition, a drive gear portion 213 connected to the door drive motor 214 is engaged with the driven gear portion 207. Thus, as the drive gear portion 213 is rotated by the door drive motor 214, the driven gear portion 207 engaged therewith rotates, and thus the door opening/closing member 205 rotates about the hinge shaft 206 to open or close the pitching hole 22.

While FIGS. 6(a) and 6(b) illustrate a configuration in which the door opening/closing member is rotated by means of the driven gear portion and the drive gear portion engaged with the driven gear portion, the present invention is not limited thereto. The hole opening/closing device of the screen baseball system according to the present invention includes any element capable of rotationally driving the door opening/closing member about the hinge shaft.

For example, a belt or chain structure may be employed instead of the gear structure, an arm rotated by the drive motor may be fixed to the door opening/closing member, and the door opening/closing member may be rotationally driven by the rotating arm.

According to another embodiment of the present invention, there is provided a screen baseball system including a cover member provided to a pitching hole formed in the screen portion as described above, such that a ball pitched by the ball pitching device can pass through the cover member.

Figure 7:
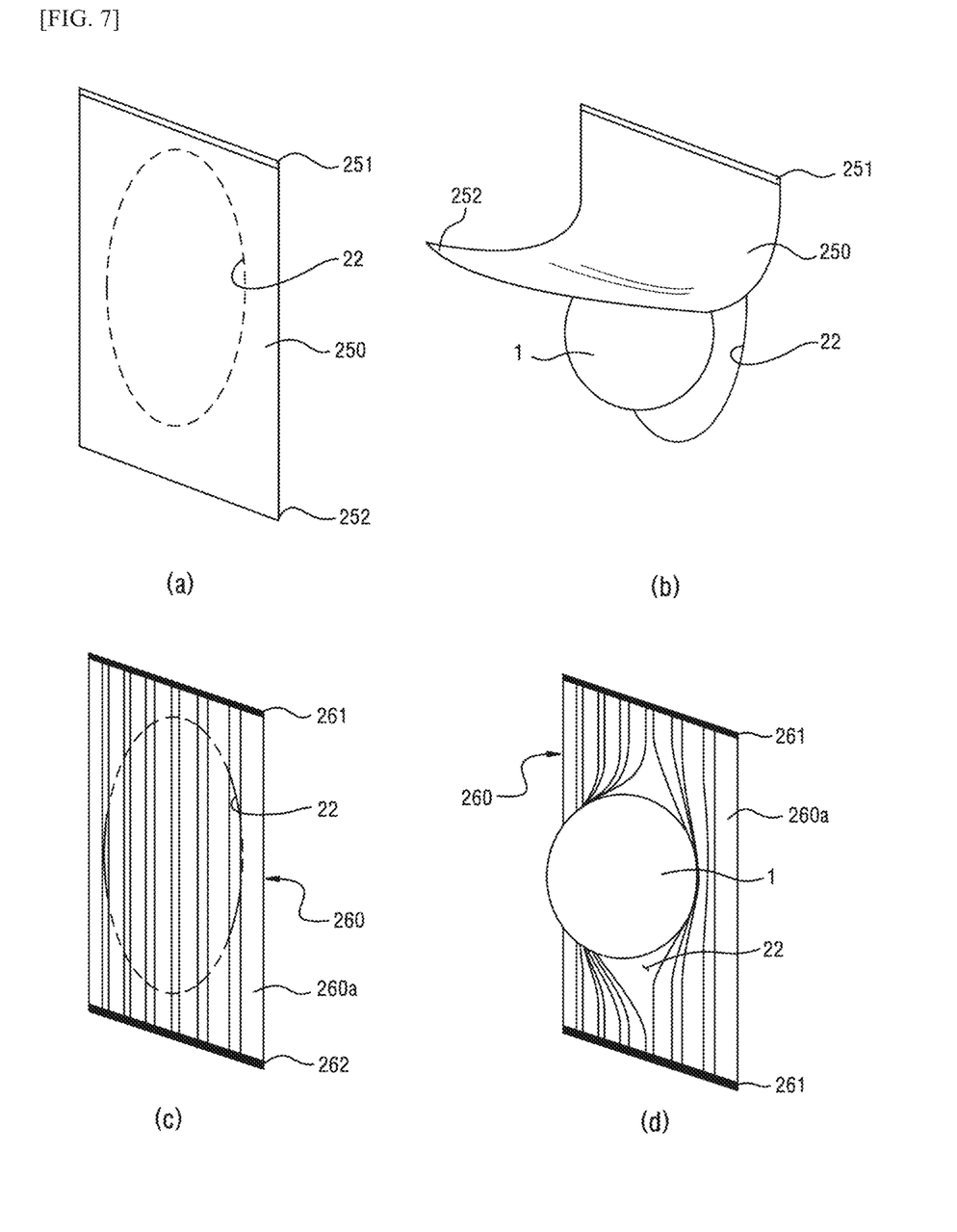
FIG. 7 is a view showing examples of a cover member for a pitching hole of a screen portion used in a screen baseball system according to another embodiment of the present invention.

FIG. 7 shows two examples of a cover member allowing a ball to pass therethrough. FIGS. 7(a) and 7(b) illustrate using a blind screen as the cover member, and FIGS. 7(c) and 7(d) illustrate using a permeable screen as the cover member.

In FIGS. 7(a) and 7(b), one side (a fixed portion 251) of the blind screen 250 covering the pitching hole 22 is fixed and the other side (a free end portion 252) thereof is formed as a free end. Thus, a ball 1 pitched through the pitching hole 22 opens and passes through the free end portion 252 of the blind screen 250.

In FIGS. 7(c) and 7(d), a plurality of element members 260a fixed to the periphery of the pitching hole 22 by a first fixing portion 261 and a second fixing portion 262 is arranged spaced apart from each other by a predetermined distance to constitute the permeable screen 260, and the ball 1 pitched through the pitching hole 22 passes through a space between the element members 260a.

Hereinafter, a pitching control method of a screen baseball system according to an embodiment of the present invention will be described with reference to the flowchart shown in FIG. 8.

In the screen baseball system according to another embodiment of the present invention, the ball-pitching unit can perform the pan-tilting operation and thus can pitch the ball in various directions. According to an embodiment, a separate wheel capable of changing the pitch of the ball may be used to change the pitch of the ball (relevant technologies correspond to conventional technologies already disclosed in many prior art documents, and therefore a detailed description of the configuration thereof will be omitted).

In addition, in the screen baseball system according to another embodiment of the present invention, the user may be provided with a means for presetting the pitching conditions related to the direction, pitch, speed, and the like of a ball to be pitched through the ball pitching device (technology related to pre-input and setting of the pitching conditions of the ball to be pitched corresponds to the conventional technology already disclosed in many prior art documents, and thus a detailed description thereof will be omitted).

Figure 8:
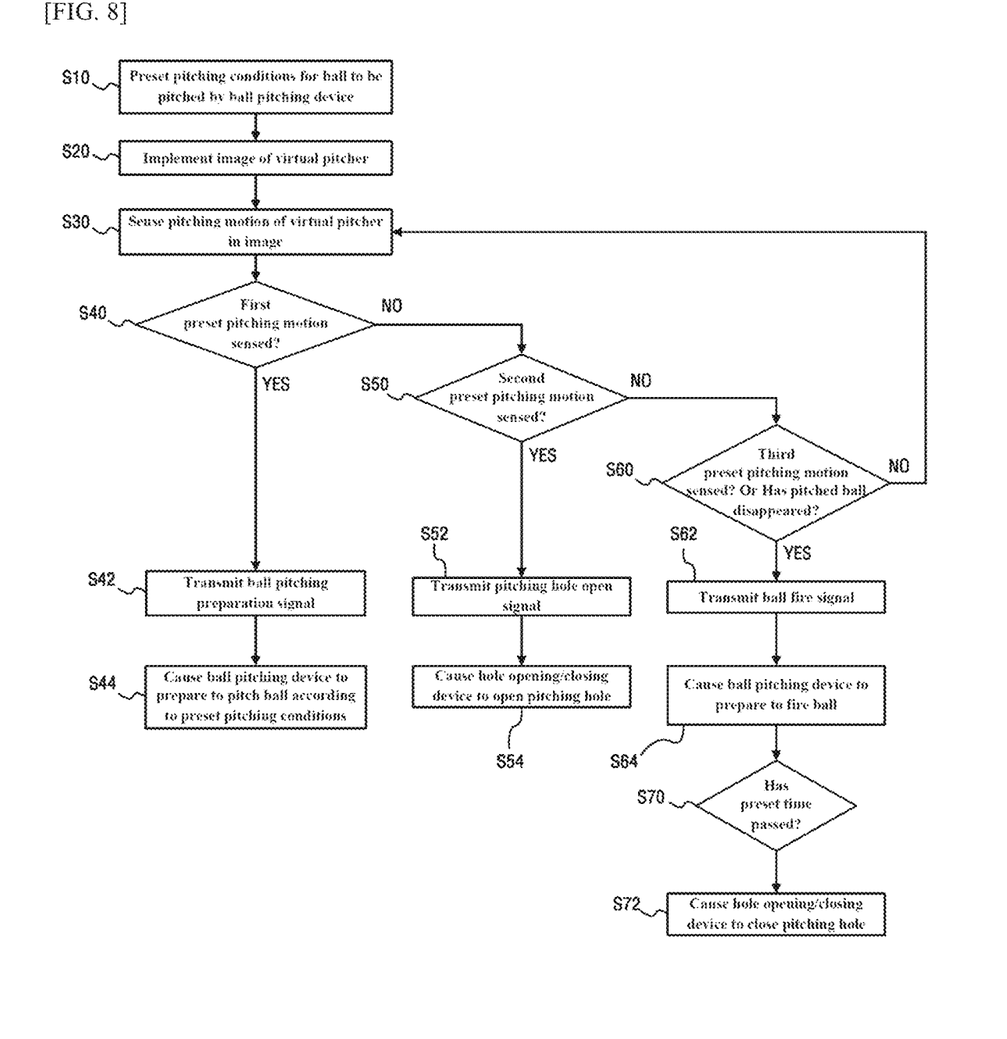
FIG. 8 is a flowchart illustrating a pitching control method of a screen baseball system according to an embodiment of the present invention.

As shown in FIG. 8, before pitching is performed in the screen baseball system according to the present invention, the user may preset the pitching conditions for the ball to be pitched by the ball pitching device (S10).

Then, as a simulation image of pitching is started, an image of a virtual pitcher is implemented and displayed on the screen portion (S20).

The virtual pitcher in the image implemented on the screen portion makes a motion of pitching the ball like a real pitcher.

The controller M (see FIG. 2 or 3) of the screen baseball system senses the pitching motion of the virtual pitcher in the image (S30).

The controller determines the time at which the pitching hole 22 is opened or closed by the hole opening/closing device, the time at which preparation for ball pitching is performed by the ball pitching device, and the time at which a prepared ball is pitched (fired) and sends a control signal to the ball pitching device (or each of the ball pitching device and the hole opening/closing device) to disrupt the execution of a corresponding operation. The controller determines the time of the corresponding operation according to the contents of the implemented image.

For example, the controller may transmit the control signal as described above by sensing the pitching motion of the virtual pitcher in the image and the position or disappearance of a ball pitched by the virtual pitcher, or the like. In order to determine the transmission time of the control signal, a specific pitching motion of the virtual pitcher may be preset, or the controller may sense weather the ball pitched by the virtual pitcher is at a specific position on the screen or whether the ball pitched by the virtual pitcher disappears from the screen. Then, the controller compares the result of sensing with the preset conditions to transmit the control signal.

In the embodiment shown in FIG. 8, the pitching motions of the virtual pitcher in the image are preset to a first pitching motion, a second pitching motion, and a third pitching motion. Then, when a pitching motion of the virtual pitcher in the image is sensed or the preset specific pitching motion is made, a control signal corresponding to the pitching motion is transmitted.

That is, as shown in FIG. 8, the controller monitors the pitching motion of the virtual pitcher in the image, and determines whether the preset first pitching motion is sensed (S40). If the first pitching motion is sensed, the controller transmits a ball pitching preparation signal (a control signal instructing the ball pitching device to prepare to fire a ball) to the pitching controller of the ball pitching device (S42).

Upon receiving the ball pitching preparation signal, the pitching controller causes the ball pitching device to prepare to pitch a ball according to the preset pitching conditions through pan-tilting driving of the ball pitching device, control of the output of the pitching driver, and the like (S44).

Here, the first pitching motion of the virtual pitcher may be preset to a motion made before pitching. For example, a setup motion or a windup motion may be preset as the first pitching motion. Of course, the first pitching motion may be a specific motion after the setup motion or the windup motion.

The ball pitching preparation signal need not be transmitted according to the specific pitching motion of the virtual pitcher. The ball pitching preparation signal may be transmitted when the sensor senses the user entering the battering zone regardless of the pitching motion of the virtual pitcher, or when the sensor senses the user entering the batting zone and a preset time passes.

The controller monitors the pitching motion of the virtual pitcher in the image and determines whether the preset second pitching motion is sensed (S50). When the second pitching motion is sensed, the controller transmits a pitching hole open signal (a control signal instructing the ball pitching device or hole opening/closing device to drive the opening/closing member keeping the pitching hole closed to open the pitching hole) to the pitching controller of the ball pitching device (in the case of the embodiment shown in FIG. 3) or the opening/closing controller of the hole opening/closing device (in the case of the embodiment shown in FIG. 2) (S52).

The pitching controller or the opening/closing controller receiving the pitching hole open signal controls the opening/closing driver to move the opening/closing member keeping the pitching hole closed to open the pitching hole (S54).

Here, the second pitching motion of the virtual pitcher may be preset to a specific pitching motion made after a setup motion or a windup motion. For example, the second pitching motion may be preset to a motion of the virtual pitcher of taking a hand holding the ball out of the glove to throw the ball. Of course, the second pitching motion may be the setup or windup motion, a motion of lifting one leg, a motion of landing one leg on the floor, or a motion of release or follow-through. A specific motion phase among various pitching motion phrases may be set as the second pitching motion.

In addition, the pitching hole open signal need not be transmitted according to a specific pitching motion of the virtual pitcher. The pitching hole open signal may be transmitted when the ball pitched by the virtual pitcher appears in the image, when the ball pitched by the virtual pitcher is located at a specific position on the screen, when the sensor senses the user entering the batting zone regardless of the pitching motion of the virtual pitcher, or when the sensor senses the user entering the batting zone and a preset time passes.

The controller monitors the pitching motion of the virtual pitcher in the image and determines whether the preset third pitching motion is sensed (S60). When the third pitching motion is sensed, the controller transmits a ball fire signal (a control signal instructing the ball pitching device to prepare to fire a ball) to the pitching controller of the ball pitching device (S62).

Upon receiving the ball fire signal, the pitching controller controls the pitching driver to fire a prepared ball (S64).

Here, the ball fire signal need not be transmitted when the virtual pitcher makes the third pitching motion. The ball fire signal may be transmitted by determining whether or not the ball thrown by the virtual pitcher is located at a specific position in the image, or may be transmitted when the ball thrown by the virtual pitcher disappears from the image after appearing in the image.

In either case, the virtual pitcher pitches in the image and an actual ball is fired in response such that the image precisely matches driving of the ball pitching device in order to make the user, who prepares to bat in the batting zone, feel like a ball thrown by a pitcher is flying toward them.

Since the ball pitching device is ready to fire the ball according to step S42 and S44 (if there is almost no delay time until the ball is actually fired after the ball fire signal is transmitted), it may be determined in step S60 whether or not the ball appears in and then disappears from the image. If the ball thrown by the virtual pitcher disappears from the image, the ball fire signal may be transmitted to the ball pitching device such that a prepared ball can be fired immediately.

If the controller is configured to transmit the ball fire signal upon sensing the third pitching motion of the virtual pitcher in the image, the third pitching operation may be preset as a later part of the pitching motion such as release or follow-through.

Since a time delay often occurs between the transmission time of the ball fire signal of the controller and the time of actual firing of the ball of the ball pitching device, the third pitching motion may not be fixed to any one specific pitching motion, or may be set to trigger transmission of the ball fire signal according to the type of the ball pitching device.

The time at which a ball is actually fired may be set to the time at which the ball pitched by the virtual pitcher in the image disappears from the image to provide a more realistic pitching experience.

Therefore, the controller may transmit the ball fire signal to the ball pitching device in consideration of the time delay from the time of transmission of the ball fire signal to the time of actually firing a ball.

Since the time delay varies among the types of the ball pitching device (a wheel type, throw type, an air pressure firing type, etc.), the first system installer may be allowed to preset the third pitching motion which is a trigger of transmission of the ball fire signal.

In addition, the third pitching motion may be set in consideration of both the pitching motion of the virtual pitcher and the motion of the ball. For example, as the third pitching motion, a specific motion may be selected from among various motions (pitch and ball) from the time of the release or follow-through motion of the virtual pitcher to the time when the ball thrown by the virtual pitcher disappears from the image, such that the time delay from transmission of the ball fire signal according to the third pitching motion to the actual firing of a ball of the ball pitching device can be adjusted in consideration of the type of the ball pitching device.

After the ball pitching device fires the ball, the controller determines whether a preset time has passed (S70). If the preset time has passed, the controller may cause the hole opening/closing device to close the pitching hole (S72). In this operation, the pitching controller may determine whether the preset time has passed and control the hole opening/closing device (in the case of the embodiment shown in FIG. 3), or the opening/closing controller may determine whether the preset time has passed and control the opening/closing driver (in the case of the embodiment shown in FIG. 2).

Figure 9:
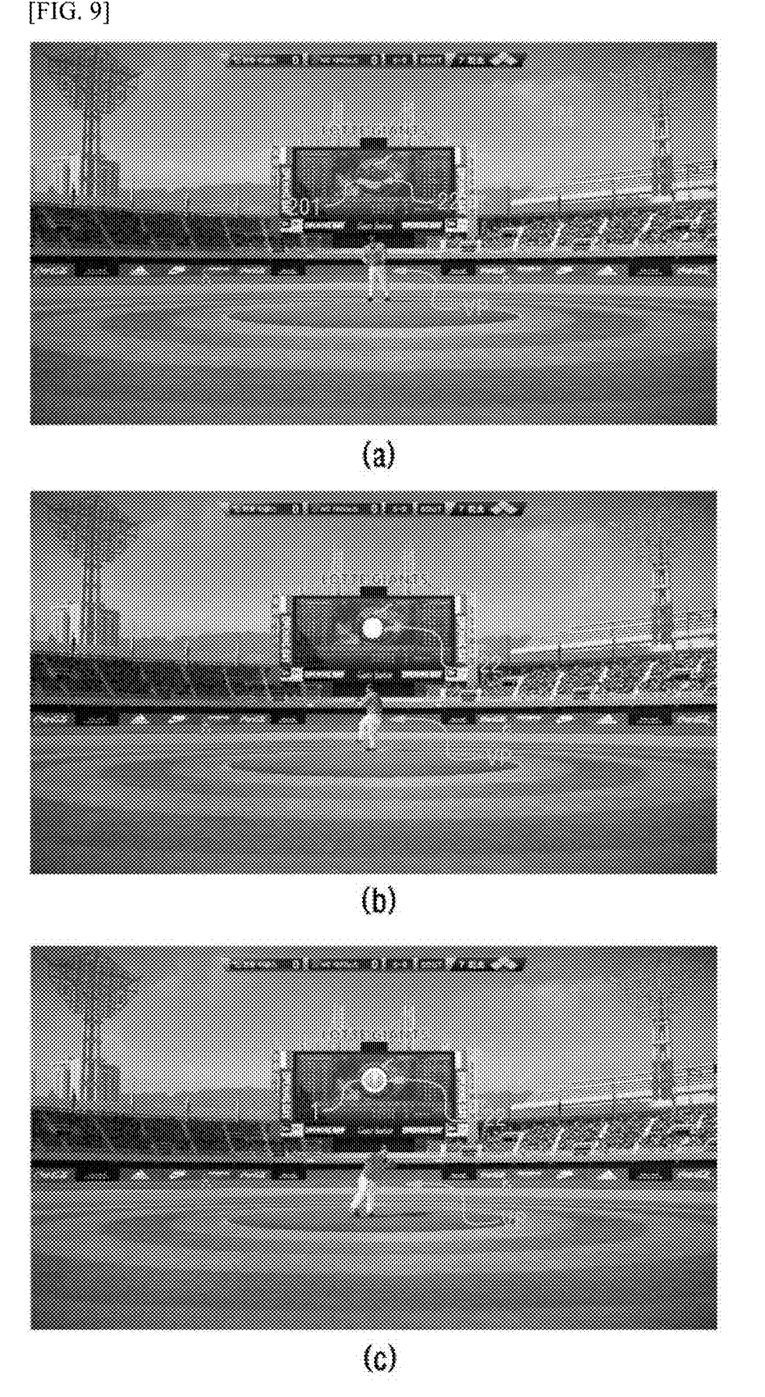
FIG. 9 illustrates an example of images in the ball pitching preparation phase, the pitching hole open phase, and the ball fire phase shown in FIG. 8.

FIG. 9(a) shows a screen image corresponding to a case when preparation for ball pitching according to the first pitching operation of steps S40 to S44 is performed, FIG. 9(b) shows a screen image corresponding to a case when the pitching hole is opened according to the second pitching motion of steps S50 to S54, and FIG. 9(c) shows a screen image corresponding to a case when the ball is fired as the ball in steps S60 to S64 disappears.

On each screen IM, the pitching hole 22 is indicated by a red circle. The pitching hole 22 is indicated in red because it is difficult to identify the pitching hole in the screen when the pitching hole remains closed.

FIG. 9(a) shows that the pitching hole 22 in the screen IM is kept closed by the opening/closing member 201, and the ball pitching device is ready to pitch a ball according to a preset pitching condition as the controller sends a ball pitching preparation signal according to the windup motion made by the virtual pitcher VP.

FIG. 9(b) shows that, as the virtual pitcher VP on the screen IM removes their hand from the glove to throw a ball, the pitching hole open signal is sent to the ball pitching device (or the hole opening/closing device) and thus the pitching hole 22 is opened by driving the opening/closing member.

FIG. 9(c) shows that a prepared ball 1 is fired by the pitching driver and passes through the pitching hole 22 according to a ball pitching signal sent to the ball pitching device as disappearance of a ball from the images showing movement of the ball is sensed on the screen after the virtual pitcher VP pitches the ball.

INDUSTRIAL APPLICABILITY

The screen baseball system, the hole opening/closing apparatus used therefor, the ball pitching apparatus used therefor, and the pitching control method of the screen baseball system according to the present invention are industrially applicable in a technical field that allows a user to perform baseball practice or a virtual baseball game in a manner that a user hits a ball fired by the ball pitching apparatus with a bat in an indoor space of a predetermined size, and the sensing apparatus senses hitting and implements a simulation image on a screen in front of the user.

The invention claimed is:
1. A screen baseball system comprising:
a screen arranged in front of a batter's box and having a pitching hole allowing a pitched ball to pass therethrough;
a ball pitching device arranged behind the screen to pitch a ball toward the batter's box through the pitching hole;
an image processor configured to implement an image of a virtual pitcher pitching a ball;
a projector configure to project the image implemented by the image processor onto the screen; and
a hole opening/closing device configured to operate to close the pitching hole when the ball pitching device does not pitch the ball and to open the pitching hole when the ball pitching device pitches the ball, the hole opening/closing device comprising:
an opening/closing member configured to open or close the pitching hole; and
an opening/closing driver configured to provide driving force to an operation of the opening/closing member.

2. The screen baseball system according to claim 1, wherein the opening/closing member comprises any one of a sliding opening/closing member configured to open or close the pitching hole by sliding vertically or horizontally in a linear direction, a rotational opening/closing member configured to open or close the pitching hole by rotating about a pivot point along a surface of the screen, and a door opening/closing member hinged to one side of the pitching hole to open or close the pitching hole,
    wherein the opening/closing driver comprises any one of a sliding drive motor configured to provide sliding driving force to the sliding opening/closing member, a rotational drive motor configured to provide rotational driving force to the rotational opening/closing member, and a door drive motor configured to provide rotational driving force to the door opening/closing member, depending on a type of the opening/closing member.

3. The screen baseball system according to claim 1, further comprising:
    a controller configured to control the ball pitching device to pitch the ball according to the image implemented by the image processor and control opening/closing of the pitching hole by the hole opening/closing device.

4. The screen baseball system according to claim 3, wherein the ball pitching device comprises:
    a ball feeder configured to feed a ball to a position for pitching;
    a pitching driver configured to fire the ball fed by the ball feeder; and
    a pitching controller configured to control the pitching driver according to a ball fire signal of the controller so as to fire a prepared ball.

5. The screen baseball system according to claim 4, wherein the opening/closing driver is controlled by the pitching controller of the ball pitching device to cause the opening/closing member keeping the pitching hole closed to open the pitching hole before the pitching driver fires the ball and to cause the opening/closing member to close the pitching hole again after the pitching driver fires the ball.

6. The screen baseball system according to claim 3, wherein the controller senses a pitching motion of the virtual pitcher in the image implemented by the image processor, wherein the controller instructs the hole opening/closing device to operate as the virtual pitcher takes a preset pitching motion and instructs the ball pitching device to fire a prepared ball according to the ball pitched by the virtual pitcher in the image.

7. A ball pitching apparatus used in a screen baseball system including a screen arranged in front of a batter's box, a projector configured to project a baseball image onto the screen, and a controller and configured to include a ball feeder arranged behind the screen to feed a ball to a position for pitching such that the ball is pitched through a pitching hole formed in the screen, and a pitching driver configured to fire the ball fed by the ball feeder, the ball pitching apparatus comprising:
    an opening/closing member configured to open or close the pitching hole formed in the screen;
    an opening/closing driver configured to provide driving force to an operation of the opening/closing member; and
    a pitching controller configured to control the opening/closing driver to cause the opening/closing member to open or close the pitching hole of the controller and to control the pitching driver to fire a prepared ball, according to a control signal of the controller of the screen baseball system.

8. A method of controlling pitching in a screen baseball system including a screen arranged in front of a batter's box, a ball pitching device arranged behind the screen to pitch a ball through a pitching hole formed in the screen, and an image processor configured to implement a baseball image including an image of a virtual pitcher pitching a virtual ball to be projected onto the screen, and a controller, the method comprising:
    sensing, by the controller, at least one of a pitching motion of the virtual pitcher in the baseball image implemented by the image processor and a ball pitched by the virtual pitcher in the baseball image;
    firing, by the ball pitching device, a ball according to a preset pitching condition as the controller is configured to sense a preset first pitching motion of the virtual pitcher in the baseball image;
    opening, by a hole opening/closing device, the pitching hole as the controller is configured to sense a preset second pitching motion of the virtual pitcher in the baseball image; and
    firing, by the ball pitching device, the prepared ball through the pitching hole as the controller is configured to sense whether the virtual ball pitched by the virtual pitcher is located at a preset position on the baseball image or whether the virtual ball pitched by the virtual pitcher has disappeared from the baseball image.

9. The method according to claim 8,
wherein the controller is configured to transmit a signal to the ball pitching device so as to prepare to fire the ball according to the preset pitching condition as the preset pitching motion of the virtual pitcher is sensed in the image implemented by the image processor, and to transmit the signal before opening the pitching hole or for firing the ball.

10. The method according to claim 9,
wherein, before opening the pitching hole, the controller is configured to sense whether the virtual pitcher in the image implemented by the image processor takes a preset specific motion among motions of the virtual pitcher from windup to follow-through and transmit the signal to cause the hole opening/closing device to open the pitching hole.

11. The method according to claim 9,
wherein the controller is configured to transmit a fire signal for firing the ball to cause the ball pitching device to fire the ball according to any one of sensing whether the virtual pitcher in the image implemented by the image processor takes a preset specific motion among motions of the virtual pitcher from windup to follow-through, sense whether the ball pitched by the virtual pitcher is located at a preset position on the image, and sense whether the ball pitched by the virtual pitcher has disappeared from the image.

12. The method according to claim 8,
wherein the controller is configured to transmit a signal to cause the hole opening/closing device to close the pitching hole when a preset time passes after the transmitting of a fire signal or when a preset time passes after the firing of the ball.

* * * * *